Feb. 16, 1943.  C. G. OLSON  2,311,299
SCREW ELEMENT AND WASHER ASSEMBLY
Original Filed Aug. 27, 1938
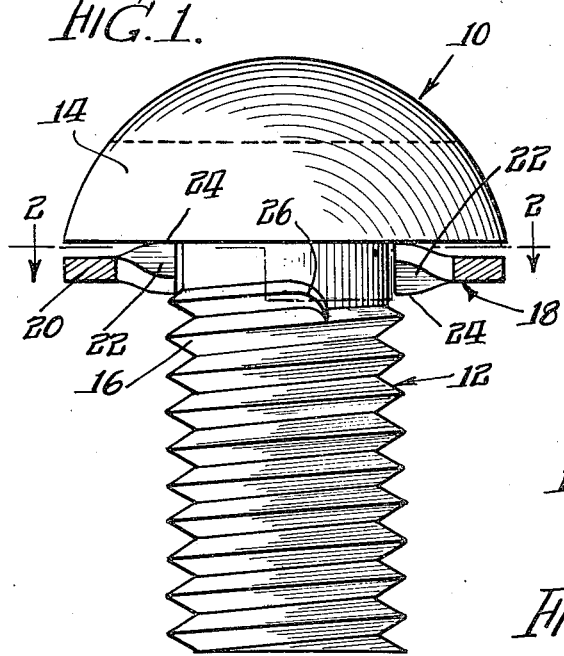
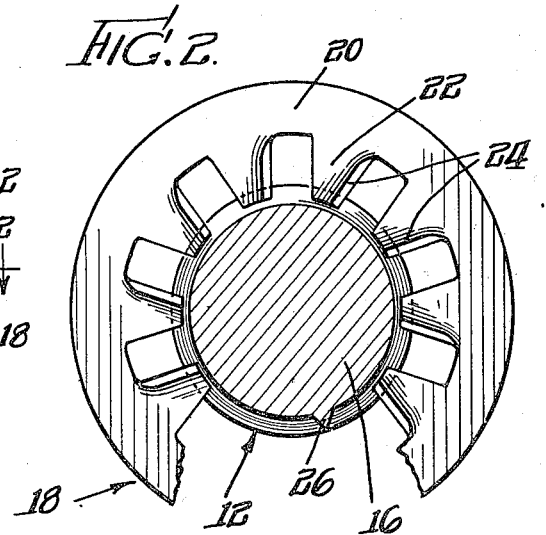
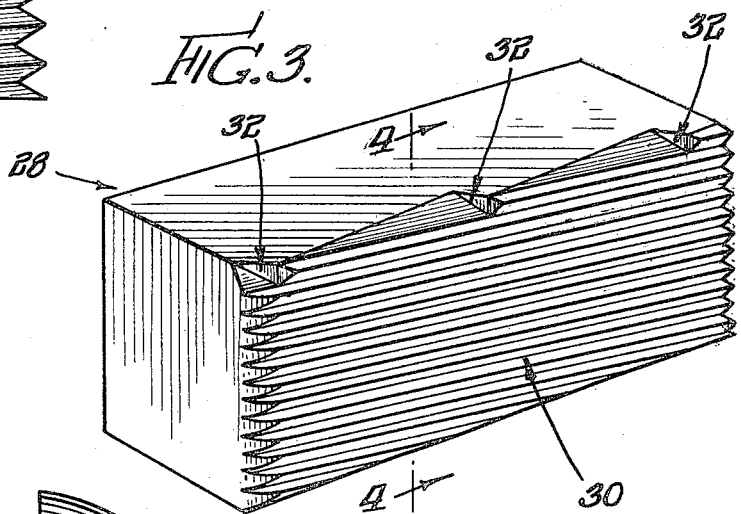
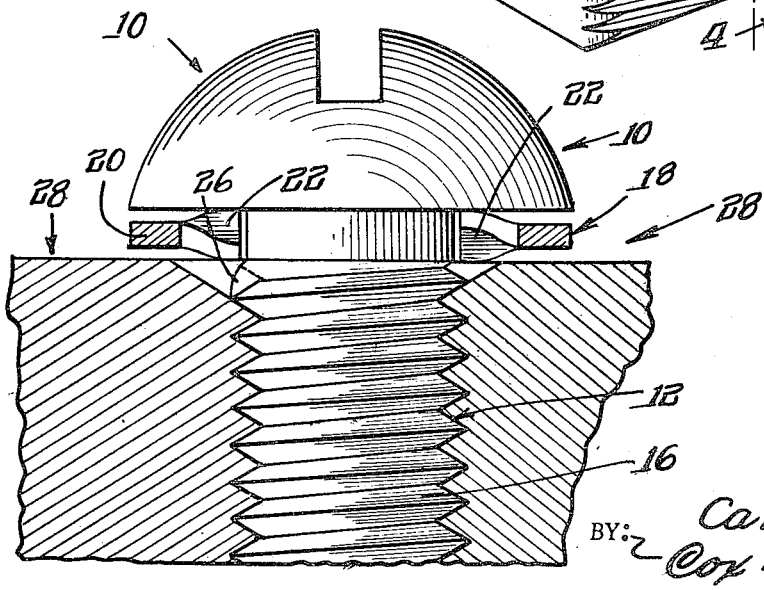
INVENTOR.
Carl G. Olson
BY Cox Moore & Olson
attys.

Patented Feb. 16, 1943

2,311,299

UNITED STATES PATENT OFFICE 2,311,299

SCREW ELEMENT AND WASHER ASSEMBLY

Carl G. Olson, Chicago, Ill., assignor to Illinois Tool Works, Chicago, Ill., a corporation of Illinois Original application August 27, 1938, Serial No. 227,045. Divided and this application September 7, 1940, Serial No. 355,743

4 Claims. (Cl. 151—32)

This invention relates generally to preassembled screws and washers, commonly known as fastener units, and more particularly to fastener units wherein the washer is secured against axial displacement from the under side of a screw head by an extruded element, as for example an extruded thread convolution.

The present invention constitutes a division of the invention of my copending application Serial No. 227,045, filed August 27, 1938, wherein the method of producing fastener units is disclosed and claimed. Experience has shown that in instances where a washer is secured beneath a screw head by an extruded element, such as an extruded thread convolution, the washers have a tendency to loosen by rotating in a retrograde direction within the thread convolutions of the screw. That is to say, unless some obstructing means is provided to prevent the inner margin of the washer from becoming seated within the thread convolution, there is a possibility of the washer and screw element becoming separated due to the unscrewing of the parts. It is therefore an important object of the present invention to provide a fastener unit in which the difficulty referred to above is completely obviated.

More specifically, the invention contemplates a fastener unit of the type referred to above equipped with means in the vicinity of the screw head and extending transversely with respect to the screw head which will prevent the inner margin of the washer from becoming lodged and consequently moved within the thread convolutions of the screw.

It is a further object of the present invention to provide a washer obstructing means or element just referred to, which may be produced contemporaneously with the rolling or extruding of the screw thread and to this end I propose to provide a thread obstructing element or means, the counterpart of which may be incorporated within a conventional thread rolling die.

The foregoing and other objects and advantages will be more apparent from the following detailed description when considered in connection with the accompanying drawing, wherein:

Figure 1 discloses a fastener unit which embodies features of the present invention, the lock washer element thereof being shown in central, transverse cross-section in order to more clearly appreciate the manner in which said washer is secured against axial separation with respect to the screw element;

Figure 2 is a transverse sectional view of the fastener unit taken substantially along the line 2—2 of Figure 1;

Figure 3 is a perspective view of a die which may be embodied in producing the thread and associated washer obstructing means or element; and Figure 4 is a fragmentary view taken substantially along the line 4—4 of Figure 3 to more clearly illustrate the position occupied by the dies and screw elements during the extrusion of the thread and washer obstructing element.

Referring now to the drawing wherein like numerals have been employed to designate similar parts throughout the figures, it will be seen that one embodiment of the invention is incorporated in a fastener unit designated generally by the numeral 10. This fastener unit 10 includes a screw 12 provided with the usual head 14 and threaded stem 16. Positioned immediately adjacent the clamping surface of the head 14 is a lock washer designated generally by the numeral 18.

This lock washer 18 comprises an annular body portion 20 of spring stock and a plurality of marginal locking elements or prongs 22 formed integral therewith. The prongs or locking elements 22 are so configurated as to present work engaging teeth or edges 24 which lie in planes spaced from and in parallelism with the bounding planes of the body 20. In the disclosed embodiment, the prongs or locking elements 22 are provided along the internal margin of the body 20, but obviously the teeth may also be located along the outer margin. In other words, the present invention is not limited to the specific embodiment of the lock washer but contemplates various type of washers without departing from the present invention.

The lock washer 18 is secured against axial displacement by an extruded element, to-wit, the upper convolution of the screw threaded shank 16. This is accomplished by causing the extrusion or rolling operation to take place after the lock washer has been telescopically associated with the screw element. This extruded element or thread extends radially a sufficient distance to overlap the internal margin of the washer so as to provide a shoulder which prevents axial separation of the lock washer and screw.

The present invention is particularly concerned with the problem of washer and screw separation resulting from the tendency for a washer to unscrew itself. That is to say, unless some means is provided to prevent the inner margin of the washer from becoming lodged within the helical space provided by the thread convolutions, it is always the tendency for this inner margin of the washer to move within this helical path and thus cause axial separation of the parts. To meet this difficulty, an obstructing element or member 26 is provided. In the present embodiment, this member 26 forms a continuation of the uppermost thread convolution and traverses the space presented by the uppermost and next-following convolution. Thus, the element 26 obstructs the path presented by the thread convolutions and thereby prevents registration or seating of the inner margin of the washer within the helical path of the screw thread.

Attention is directed to the fact that this obstructing means or member 26 may be produced contemporaneously with the formation of the thread convolutions in the threaded shank 16. Thread rolling dies 28 may be used in the contemporaneous or simultaneous formation of the thread and washer obstructing element 26. These dies 28 are well known, so-called flat dies provided with the usual serrated or work surface 30 for producing screw threads. This die is especially formed along its upper margin by configurations 32 which serve as the screw blank rolls between the die blocks to cause the formation of the obstructing element 26.

It will be apparent from the foregoing that the present invention contemplates a fastener unit of extremely simple and practical construction which may be produced by the practice of simple and economical methods. The art of thread rolling has been practiced for many years and has been found to be one of the most economical methods for producing thread convolutions on a screw blank. The production of the obstructing element simultaneously with the rolling of the screw thread with substantially no added expense makes it possible to produce the fastener unit at minimum cost. Fastener units of the type described herein may be safely transported and moved or handled in any way without the danger of loss or separation of parts due to unscrewing. Thus, fastener units produced in accordance with the present invention have a very practical application in instances where the internal marginal configuration of the washer and the space or path presented between the thread convolutions on the screw shank are such as to present the inherent possibility or tendency for the washers to unscrew when subjected to handling or movement after assembling.

While certain structural embodiments of the invention have been disclosed herein, it will be apparent that invention is by no means limited to this particular structure but is capable of other modifications or changes without departing from the spirit and scope of the appended claims.

The invention is hereby claimed as follows:

1. A screw and lock washer assembly comprising a screw having a head and a shank, a thread formed on the shank, a lock washer arranged on the shank between the thread and the screw head, the outer diameter of the thread being greater than the inner diameter of the lock washer whereby to provide a shoulder for counteracting axial displacement of the lock washer, and a burr formed on the shank in the vicinity of the uppermost thread convolution whereby the inner margin of the washer is secured against tracking within the helical trough of the thread convolutions.

2. A screw and lock washer assembly comprising a screw having a head and a shank, a thread formed on the shank, a lock washer arranged on the shank between the thread and the screw head, the outer diameter of the thread being greater than the inner diameter of the lock washer, and a portion of the thread being diverted from its normal helical position whereby the lock washer is retained in permanent association with the screw shank.

3. A screw and lock washer assembly comprising a screw having a head and a shank, a thread formed on the shank, a lock washer arranged on the shank between the thread and the screw head, the outer diameter of the thread being greater than the inner diameter of the lock washer, and the end of the thread adjacent the lock washer being deflected toward an adjoining thread whereby to close the trough of the thread and retain the lock washer in permanent association upon the screw.

4. A screw and lock washer assembly comprising a screw having a head and shank, a thread formed on the shank, a lock washer positioned on the shank between the thread and the screw head, and protuberance means in the vicinity of the terminating portion of the thread beneath said lock washer and providing an obstruction between said terminating portion and the next adjacent thread convolution so as to prevent tracking of the inner margin of the lock washer in the helical space presented between said convolutions.

CARL G. OLSON.